US006845917B1

United States Patent
Chen

(10) Patent No.: US 6,845,917 B1
(45) Date of Patent: Jan. 25, 2005

(54) WATER OUTLET STRUCTURE OF CERAMIC CONTROL VALVE FOR SINGLE-HANDLED FAUCET

(75) Inventor: Mei-Li Chen, Taipei (TW)

(73) Assignee: Kuching International, Ltd., Taichung Hsien (TW)

( * ) Notice: Subject to any disclaimer, the term of this patent is extended or adjusted under 35 U.S.C. 154(b) by 0 days.

(21) Appl. No.: 10/624,516

(22) Filed: Jul. 23, 2003

(51) Int. Cl.⁷ .............................................. G05D 23/00
(52) U.S. Cl. .............. 236/12.1; 236/12.11; 137/625.28; 137/625.41; 251/208; 251/304
(58) Field of Search ............................. 236/12.1, 12.11, 236/12.16; 137/454.6, 625.28, 625.4, 625.41, 625.46; 251/208, 304, 317

(56) References Cited

U.S. PATENT DOCUMENTS

| | | | | |
|---|---|---|---|---|
| 5,143,349 A | * | 9/1992 | Korfgen et al. | 251/314 |
| 5,190,077 A | * | 3/1993 | Pawelzik et al. | 137/625.46 |
| 5,368,071 A | * | 11/1994 | Hsieh | 137/625.41 |
| 5,402,827 A | * | 4/1995 | Gonzalez | 137/625.17 |
| 6,009,893 A | * | 1/2000 | Chang | 137/98 |
| 6,296,017 B2 | * | 10/2001 | Kimizuka | 137/625.17 |

* cited by examiner

Primary Examiner—Marc Norman
(74) Attorney, Agent, or Firm—Troxell Law Office PLLC

(57) ABSTRACT

A water outlet structure of a ceramic control valve for a single-handled faucet is made up of a valve body having a housing chamber for a regulating seat with a control stick joined thereto to be adapted therein, and an upper switching control valve having a regulating cavity of proper width and length disposed: at the lower bottom thereof matching to cold/hot water inlet holes and a water outlet hole of a lower switching control valve, and cold/hot water inlet passages and a water outlet passage of a switching control valve. The regulating cavity thereof has a slant plane facet defining at one front side in a trapezoid-like design. When the handle of a faucet is pried upwards from the center or to the right for the discharge of cold water, the upper switching control valve activated by the control stick thereof will slide forwards with the regulating cavity moved therewith to open the cold water outlet hole, and the slant plane facet thereof will align in parallel with a slant side of the hot water inlet hole to seal up the discharge of hot water, preventing the waste of energy in the constant on-and-off of the hot water heater and avoiding the danger of burning the users by accident. Besides, the trapezoid-like regulating cavity increased in width and provided with plane surfaces at both sides thereof can also maintain the discharge of cold water to the maximum in a smooth manner.

1 Claim, 5 Drawing Sheets

WATER OUTLET STRUCTURE OF CERAMIC CONTROL VALVE FOR SINGLE-HANDLED FAUCET

BACKGROUND OF THE INVENTION

The present invention is related to a water outlet structure of a ceramic control valve for a single-handled faucet, comprising a valve body having a housing chamber for a regulating seat with a control stick joined thereto to be adapted therein, and an upper switching control valve, having a regulating cavity of proper width and length defining the central lower bottom thereof, matching to a lower switching control valve and a switching control base. When the handle of a faucet is pried upwards from the center for the discharge of cold water, the upper switching control valve activated by the control stick thereof will slide forwards with the regulating cavity moved therewith to open a cold water inlet hole and sealed up a hot water inlet hole of the lower switching control valve thereof via a slant plane facet, preventing the waste of energy and the danger of burning the users by accident. Besides, the regulating cavity increased in width and defined by plane surfaces can also keep the discharge of water to the maximum in a smooth manner.

Please refer to FIG. 1. A conventional water outlet structure of a ceramic control valve for a single-handled faucet is mainly made up of a valve body 10 having a housing chamber 11 disposed at the center for a regulating seat 20 with a control stick 21 joined thereto to be adapted therein, and an upper switching control valve 30 having an elongated oval regulating hole 31 defined at the center thereof matching to cold/hot water inlet holes 41, 42 and a water outlet hole 43 of a lower switching control valve 40, and cold/hot water inlet passages 51, 52 and a water outlet passage 53 of a switching control base 50.

Please refer to FIG. 2. In practical use, the handle of a faucet is pried upwards from the center for the discharge of water, activating the control stick 21 to slide forwards the upper switching control valve 20 and the elongated oval regulating hole 21 therewith, opening both the cold/hot water inlet holes 41, 42 of the lower switching control valve 40 thereof in communication with the elongated oval regulating hole 21 thereof for cold/hot water to come out from the cold/hot water passages 51, 52 of the switching control base 50 thereof. Via the elongated oval regulating hole 21' thereof, cold/hot water is discharged from the water outlet hole 43 and the water outlet passage 53 thereof respectively for use.

There are some drawbacks to such conventional water outlet structure of a ceramic control valve for a single-handled faucet. First, people usually pry up the handle of a faucet from the center in hand-washing, which will activate the discharge of cold/hot water at the same time, automatically igniting the hot water heater and unnecessarily resulting in the waste of energy like gas, electricity, or coals, etc. Second, the instant on-and-off of the hot water heater within the short time of hand-washing may cause the insufficiency of the ignition thereof and result in the leakage of gas, jeopardizing the safety of the household. Third, the users might carelessly get burned by hot water when prying up the handle of the faucet from the center in hand-washing.

Please refer to FIG. 3. Another conventional water outlet structure of a ceramic control valve for a single-handled faucet comprises a valve body 10' having a housing chamber 11' disposed at the center for a regulating seat 20' with a control stick 21' joined thereto to be adapted therein. The regulating seat 20' is engaged with an upper switching control valve 30', a lower switching valve 40', and a switching control base 50'. At the central lower bottom of the upper switching control valve 30' is disposed a regulating groove 31' having an are plane extending outwards at one side and a straight plane 311' defining at the other side thereof. The lower switching control valve 40' has a large arc cold water inlet bole 41' and a small arc hot water inlet hole 42' with an inner straight facet 421' disposed at one side thereof, and a central water outlet hole 43' disposed at the other side thereof. The regulating groove 31' of the upper switching control valve 30' is matched to the large and small cold/hot water inlet holes 41', 42' and the water outlet hole 43' of the lower switching control valve 40', and cold/hot water inlet passages 51', 52' and a water outlet passage 53' of the switching control base 50.

Please refer to FIG. 4. In practical use, the handle of a faucet is pried upwards from the center for the discharge of cold water, activating the control stick 21' to slide forwards the upper switching control valve 20' with the straight plane 311' of the regulating groove 31' thereof moved therewith to abut the inner straight facet 421' of the small arc hot water inlet hole 42' for sealing up the discharge of hot water. Thus, via the regulating groove 31', cold water coming out from the cold water passage 52' of the switching control base 50' thereof and flowing through the large arc cold water inlet hole 41' thereof is discharged from the water outlet passage 53' thereof for use.

There are some disadvantages to the second conventional water outlet structure of a ceramic control valve for a single-handled faucet. Most of all, the regulating groove 31' is rather narrow in width which permits only a small quantity of water to flow therethrough. Besides, an A-shaped space is defined at one side by the arc plane of the regulating groove 31' thereof which can hinder the smooth discharge of cold water therefrom.

SUMMARY OF THE PRESENT INVENTION

It is, therefore, the primary purpose of the present invention to provide a water outlet structure of a ceramic control valve for a single-handled faucet, made up of a valve body, a regulating seat with a control stick joined thereto, and an upper switching control valve having a regulating cavity of proper width and length disposed at the lower bottom thereof matching to cold/hot water inlet holes and a water outlet hole of a lower switching control valve, and cold/hot water inlet passages and a water outlet passage of a switching control valve; whereby, when the handle of a faucet is pried upwards from the center for the discharge of cold water, the upper switching control valve activated by the control stick thereof will slide forwards with the regulating cavity moved therewith to open the cold water outlet hole thereof, and a slant plane facet of the regulating cavity will align in parallel with a slant side of the hot water inlet hole thereof to seal up the discharge of hot water, preventing the waste of energy in the constant on-and-off of the hot water heater and avoiding the danger of burning the users by accident. Besides, the regulating cavity in a trapezoid-like design is increased in width and provided with plane surfaces at both sides thereof, keeping the water discharge to the maximum in a smooth manner.

DETAILED DESCRIPTION OF THE PREFERRED EMBODIMENTS

Figure 5:
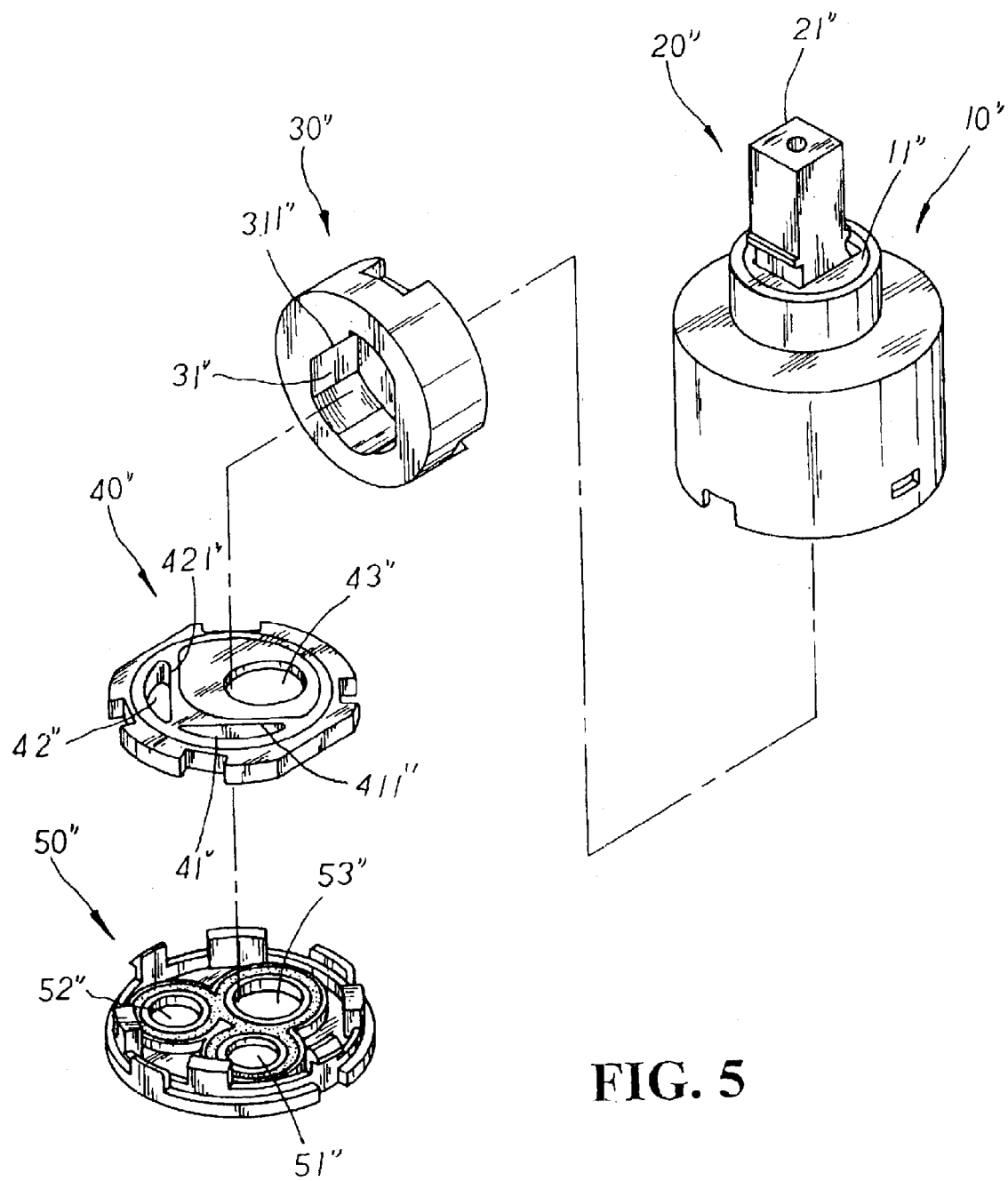
FIG. 5 is a perspective exploded view of the present invention.

Please refer to FIG. 5. The present invention is related to a water outlet structure of a ceramic control valve for a single-handled faucet, comprising a valve body 10", a regulating seat 20", an upper switching control valve 30", a lower switching control valve 40", and a switching control base 50". The valve body 10" has a housing chamber 11" disposed at the center thereof for the regulating seat 20" with a control stick 21" joined thereto to be adapted therein. The regulating seat 20" thereof is matched to the upper switching control valve 30", the lower switching control valve 40", and the switching control base 50" thereof. The upper switching control valve 30" has a regulating cavity 31" of proper width and length disposed at the center of the lower bottom thereof, and a slant plane facet 311" defining at one front side of the regulating cavity 31" in a trapezoid-like design. A pair of cold/hot water inlet holes 41", 42" with slant sides 411", 421" defined at one long side thereof respectively are symmetrically disposed at one side of the lower switching control valve 40", while a water outlet hole 43" is provided at the middle of the other side thereof. The regulating cavity 31 thereof is matched to the cold/hot water inlet holes 41", 42" and the water outlet hole 43" of the lower switching control valve 40, and to cold/hot water inlet passages 51", 52" and a water outlet passage 53" of the switching control base 50" thereof.

Figure 1:
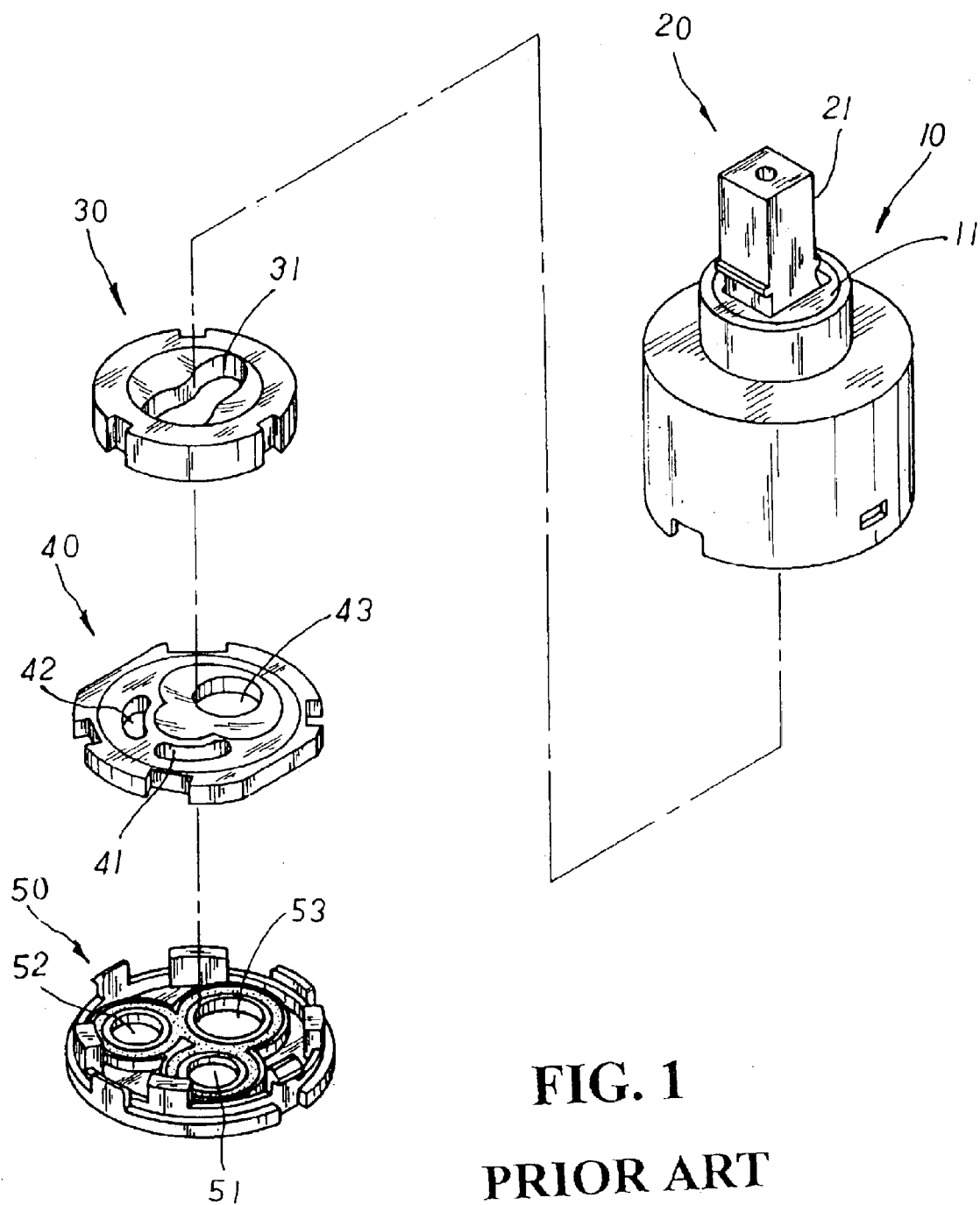
FIG. 1 is a perspective exploded view of a conventional water outlet structure of a ceramic control valve for a single-handled faucet.
Figure 2:
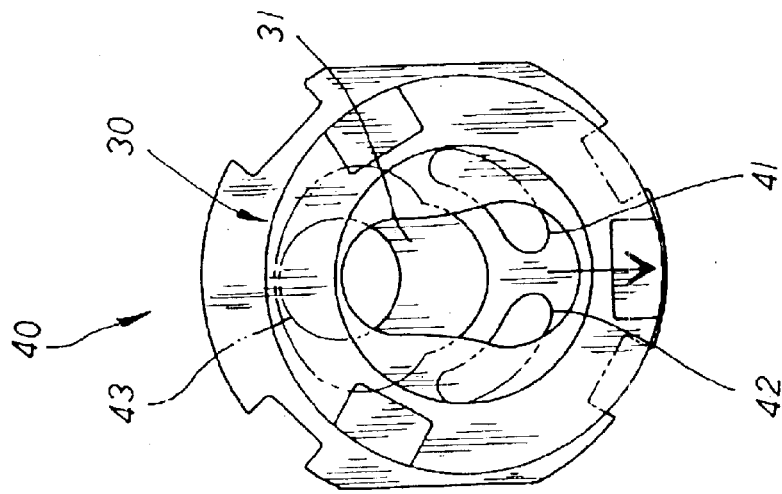
FIG. 2 is a sectional view of the first conventional water outlet structure of a ceramic control valve for a single-handled faucet in practical use.
Figure 6:
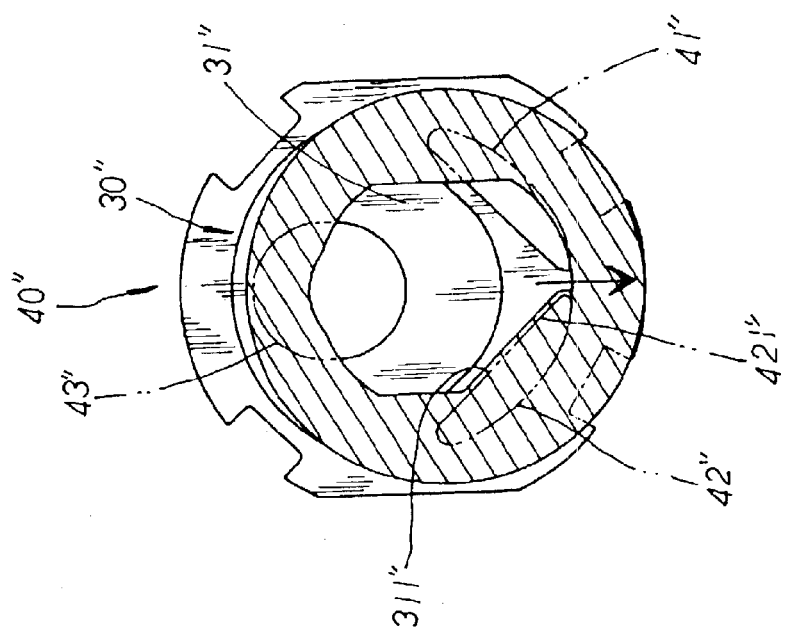
FIG. 6 is a sectional view of the present invention in practical use.
Figure 3:
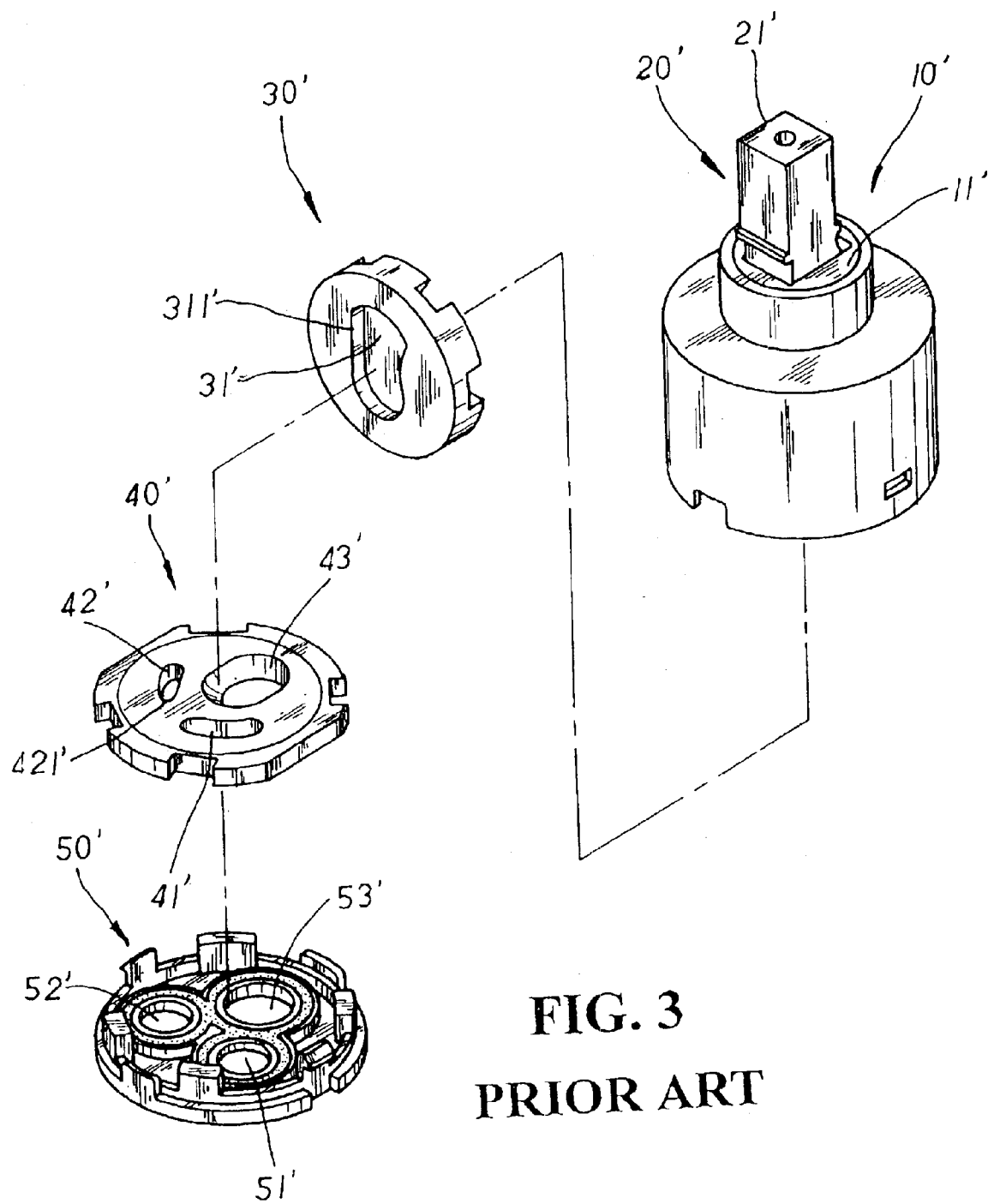
FIG. 3 is a perspective exploded view of another conventional water outlet structure of a ceramic control valve for a single-handled faucet.
Figure 4:
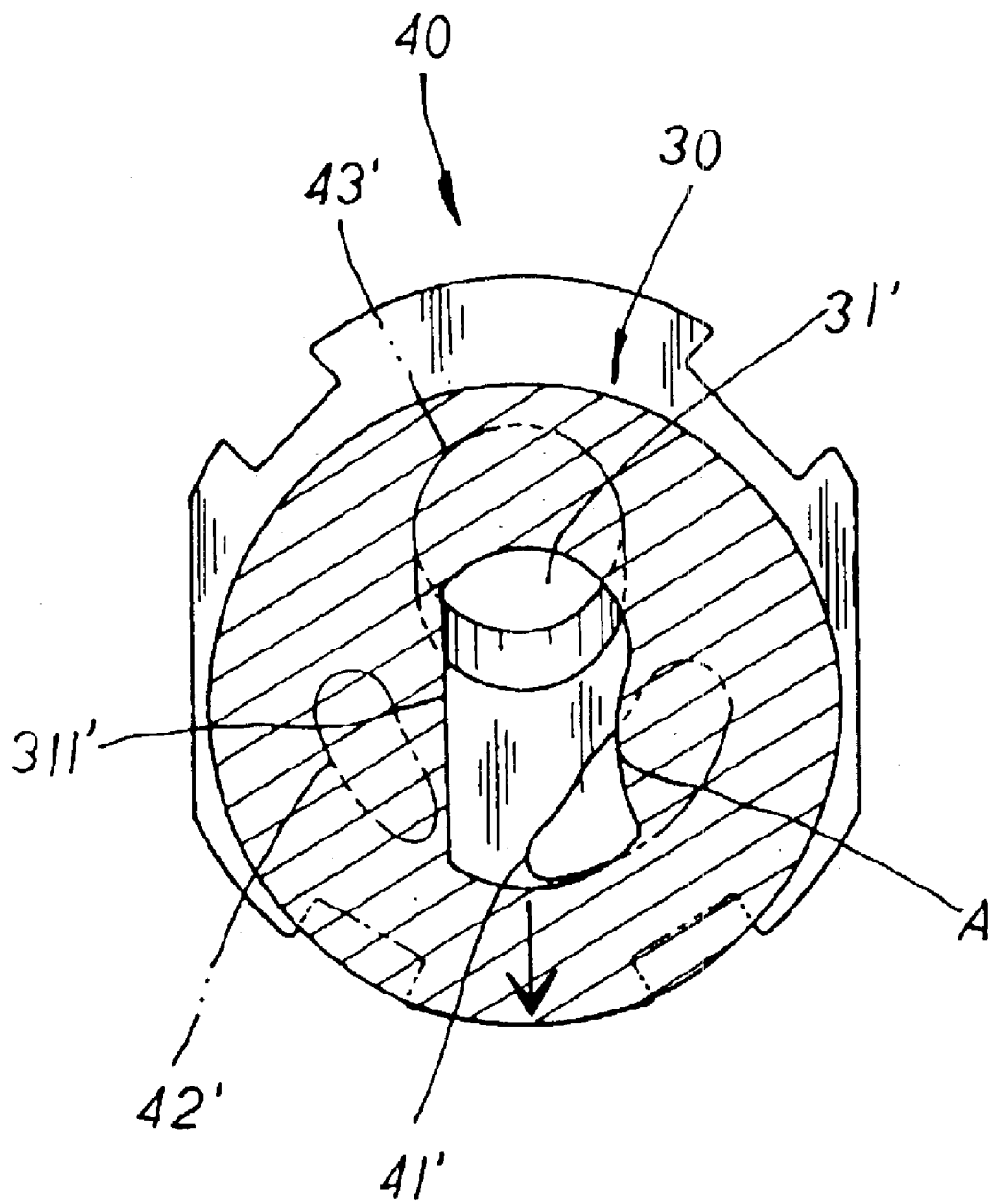
FIG. 4 is a sectional view of the second conventional water outlet structure of a ceramic control valve for a single-handled faucet in practical use.

Please refer to FIG. 6. In practical use, the handle of a faucet is pried upwards from the center or to the right for the discharge of cold water, moving the control stick 21" of the regulating seat 20" to activate the upper switching control valve 30" therewith. The upper switching control valve 30" will slide forwards, and the slant plane facet 311" of the regulating cavity 31" will move therewith to align in parallel with the slant side 421" of the hot water inlet hole 42" to seal up the discharge of hot water. Meanwhile, the cold water inlet bole 41" of the lower switching control valve 40" is revealed for cold water coming through the cold water inlet passage 51" of the switching control base 50" to flow there-from into the regulating cavity 31" and channeled thereby to be discharged for use via the water outlet hole 43" and the water outlet passage 53" of the lower switching control valve 40" and the switching control base 50" thereof respectively.

Thus, the slant plane facet 311" of the regulating cavity 31" thereof matching to the slant side 421" of the hot water inlet hole 42" thereof can securely block the hot water discharge while the regulating seat 20" thereof is switched for the discharge of cold water in practical use, preventing the unnecessary waste of energy in the constant on-and-off of the hot water heater and avoiding the danger of burning the users by accident. Furthermore, the regulating cavity 31" designed in a trapezoid-like shape and increased in width can also maintain the discharge of cold water to the maximum, permitting 32.891L/min in large quantity and 0.1 bar 7L/min under low water pressure. The plane surfaces defining both sides of the regulating cavity 31" also facilitate the smooth discharge of cold water in practical use.

What is claimed is:

1. A water outlet structure of a ceramic control valve for a single-handled faucet, comprising a valve body, a regulating seat, an upper switching control valve, a lower switching control valve, and a switching control base wherein the valve body has a housing chamber disposed at the center thereof for the regulating seat with a control stick joined thereto to be adapted therein, and the upper switching control valve has a regulating cavity of proper width and length disposed at the center of the lower bottom thereof matching to cold/hot water inlet holes and a water outlet hole of the lower switching control valve, and cold/hot water inlet passages and a water outlet passage of the switching control valve thereof; the water outlet structure being characterized by that, the regulating cavity of the upper switching control valve having a slant plane facet defining at one front side thereof in a trapezoidal design; and the cold/hot water inlet holes of the lower switching control valve having slant facets defined at one long side thereof respectively;

when the handle of a faucet is pried upwards from the center or to the right for the discharge of cold water, the upper switching control valve activated by the control stick thereof will slide forwards with the regulating cavity moved therewith to open the cold water inlet hole thereof for the discharge of cold water via the water outlet hole and water outlet passage thereof, and the slant plane facet of the regulating cavity will align in parallel with the slant side of the hot water inlet hole to seal up the discharge of hot water, preventing the waste of energy of the hot water heater and avoiding the danger of burning the users by accident.

* * * * *